US008573558B2

(12) United States Patent
Wang

(10) Patent No.: US 8,573,558 B2
(45) Date of Patent: Nov. 5, 2013

(54) PNEUMATIC ACTUATOR AIR FLOW CONTROL SYSTEM

(75) Inventor: James Wang, Taichung (TW)

(73) Assignee: Easytork Automation Corporation, Saint Louis, MO (US)

( * ) Notice: Subject to any disclaimer, the term of this patent is extended or adjusted under 35 U.S.C. 154(b) by 286 days.

(21) Appl. No.: 13/029,301

(22) Filed: Feb. 17, 2011

(65) Prior Publication Data

US 2012/0211685 A1 Aug. 23, 2012

(51) Int. Cl.

| | |
|---|---|
| ***F16K 31/12*** | (2006.01) |
| ***F16K 31/44*** | (2006.01) |
| ***F15B 13/044*** | (2006.01) |
| ***F01C 9/00*** | (2006.01) |

(52) U.S. Cl.

USPC .................. 251/28; 251/27; 251/73; 91/459; 92/121

(58) Field of Classification Search

USPC ............ 251/26, 25, 28, 29, 30.01, 73, 31, 27; 137/625.64; 91/51, 466, 459; 92/120–125

See application file for complete search history.

(56) References Cited

U.S. PATENT DOCUMENTS

| | | | | |
|---|---|---|---|---|
| 3,554,096 A * | 1/1971 | DeJager | .......................... | 92/125 |
| 4,472,105 A * | 9/1984 | Takiguchi et al. | .............. | 415/13 |
| 5,447,285 A * | 9/1995 | Yokogi | .......................... | 251/27 |
| 2008/0163939 A1* | 7/2008 | Williams et al. | ......... | 137/596.14 |

* cited by examiner

*Primary Examiner* — John K Fristoe, Jr.
*Assistant Examiner* — Michael R Reid
(74) *Attorney, Agent, or Firm* — Che-Yang Chen; Law Office of Michael Chen

(57) ABSTRACT

A pneumatic actuator air flow control system includes a pneumatic rotary actuator (PRA) and a solenoid air flow control valve (SAFCV). The PRA contains an air reservoir and a vane housing allowing pressurized air to rotate an air-driven vane. The SAFCV includes a flow control valve body (FCVB), a pilot solenoid valve (PSV) and a switch system, wherein the FCVB and the PRA can be connected to direct the pressurized air into the air reservoir, and the PSV is used to control the pressurized air in and out of the PRA to change the vane's rotation movement in the vane housing. Additionally, the switch system allows users to switch between a double-acting and fail-safe operation. When there is no pressurized air and/or electrical power and if an emergent need to open or close the valve, a manual override in the PSV can be used without further installation of a declutchable manual gear operator or external piping when there is no pressurized air and/or electrical power.

10 Claims, 15 Drawing Sheets

PNEUMATIC ACTUATOR AIR FLOW CONTROL SYSTEM

FIELD OF THE INVENTION

The present invention provides a pneumatic actuator air flow control system, specifically this technology providing a pneumatic rotary actuator and a solenoid air flow control valve which allows easily switching between a double-acting and a fail-safe model. It also provides an emergency manual override operation without an external installation of a declutchable manual gear operator (gear box) or external piping in the event of no pressurized air and/or electrical power.

BACKGROUND OF THE INVENTION

Currently, there are many kinds of actuator designs which use pressure or torque to force the rotation of the shaft in the actuator (in both clockwise and counterclockwise manners) to drive the rotary valve to open and close, and further control the on/off position of the valve in a pipeline. There are two types of pneumatic rotary actuators: single-acting and double-acting. The single-acting actuator is used on the valve that requires fail-return and traditional single-acting actuators typically rely on the compression or torsion of springs. The released force in the spring provides resilient force for the fail-return action (either fail-open or fail-close) and when there is supply of pressurized air, the spring tension must first be overcome to drive the shaft to open or close the valve, so the effective torque will decrease as the spring resistance increases. When there is no supply of pressurized air, the actuator can use returning force of the spring to rotate the shaft and valve to its fail-return position (either fail-open or fail-close). The operation is so called “fail-return,” and the output torque will decrease as tension in the spring diminishes. As to the double-acting actuator operation, generally the supply of pressurized air source is necessary and the supply of the pressurized air, which is in and out of the actuator, drives the shaft and valve to open or close. When there is no supply of pressurized air, the actuator cannot move, unlike the single-acting actuators which can rely on the spring tension as the fail-return force to fail-open or fail-close the valve. However, when there is supply for pressurized air, the open and close torque output will be far higher than that of the single-acting actuators. Traditionally the single-acting actuators and double-acting actuators require a solenoid air flow control valve in combination with gas and electricity, to open or close the valve. In the event there is no supply of pressurized air and/or electricity and there is an emergency need to open or close the valve, the traditional method is to install a declutchable manual gear operator (gear box) underneath the actuator to act as an emergency switch when there is no air source. But the disadvantage is the packaging occupies more spaces and the total cost is higher. In addition, from the manufacturing and distributor’s perspective, they must produce and inventory the single-acting and double-acting actuators in response to the different needs from customers. If they cannot provide a single product that can perform both single-acting and double-acting functions, the total production and inventory costs will increase accordingly.

SUMMARY OF THE INVENTION

The technical problem to be solved in the present invention: traditional single-acting actuators typically rely on the compression or torsion of springs. The released force in the spring provides resilient force for the fail-return action (either fail-open or fail-close) and when there is supply of pressurized air, the spring tension must first be overcome to drive the shaft to open or close the valve, so the effective torque will decrease as the spring resistance increases. When there is no supply of pressurized air, the actuator can use returning force of the spring to rotate the shaft and valve to its fail-return position (either fail-open or fail-close). The operation is so called “fail-return,” and the output torque will decrease as tension in the spring diminishes. As to the double-acting actuator operation, generally the supply of pressurized air source is necessary and the supply of the pressurized air, which is in and out of the actuator, drives the shaft and valve to open or close. When there is no supply of pressurized air, the actuator cannot move, unlike the single-acting actuators which can rely on the spring tension as the fail-return force to fail-open or fail-close the valve. However, when there is supply for pressurized air, the open and close torque output will be far higher than that of the single-acting actuators. Traditionally the single-acting actuators and double-acting actuators require a solenoid air flow control valve in combination with gas and electricity, to open or close the valve. In the event there is no supply of pressurized air and/or electricity and there is an emergency need to open or close the valve, the traditional method is to install a declutchable manual gear operator (gear box) underneath the actuator to act as an emergency switch when there is no air source. But the disadvantage is the packaging occupies more spaces and the total cost is higher. In addition, from the manufacturing and distributor’s perspective, they must produce and inventory the single-acting and double-acting actuators in response to the different needs from customers. If they cannot provide a single product that can perform both double-acting and fail-return functions, the total production and inventory costs will increase accordingly.

The technical point to solve the problem mentioned above: providing a pneumatic actuator air flow control system which uses a pneumatic rotary actuator in combination with a solenoid air flow control valve, wherein the pneumatic rotary actuator contains an air reservoir and a vane housing where the pressurized air is allowed to rotate an air-driven vane. Depending on different user circumstances, the specified solenoid air flow control valve can be quickly switched between the double-acting and fail-safe operations to control the valve. The solenoid air flow control valve primarily includes a flow control valve body, a pilot solenoid valve and a switch system to form a solenoid air flow control valve, wherein the flow control valve body and pneumatic rotary actuator can be connected in order to direct the source of the pressurized air into the air reservoir, the pilot solenoid valve is used to control the pressurized air flow pattern in and out of the pneumatic rotary actuator in order to change the vane’s rotation movement in the vane housing, and the switch system allows users to switch between the double-acting and fail-safe operations. In the event there is no pressurized air and/or electrical power and there is an emergency need to open or close the valve, the manual override operation built in the pilot solenoid valve can be used, without further installation of a declutchable manual gear operator or external piping in the event of no pressurized air and/or electrical power.

Comparing with conventional techniques, the pneumatic actuator air flow control system in the present invention utilizes the solenoid air flow control valve to quickly switch between the double-acting and fail-safe operations depending on different user circumstances, which improves the functions of both single-acting and double-acting actuators, especially under different circumstances it does not need external installation of a declutchable manual gear operator or external piping for emergency manual override operation, which may lead to more costs, higher maintenance frequency and complexity. Through this invention the same actuator can be used for both fail-safe and double-acting functions. From manufacturing companies' perspective there is no need to invest heavily in multiple model lines, and on the other hand distributors do not need to invest more to buy both single-acting and double-acting actuators, so the inventory concern is reduced.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
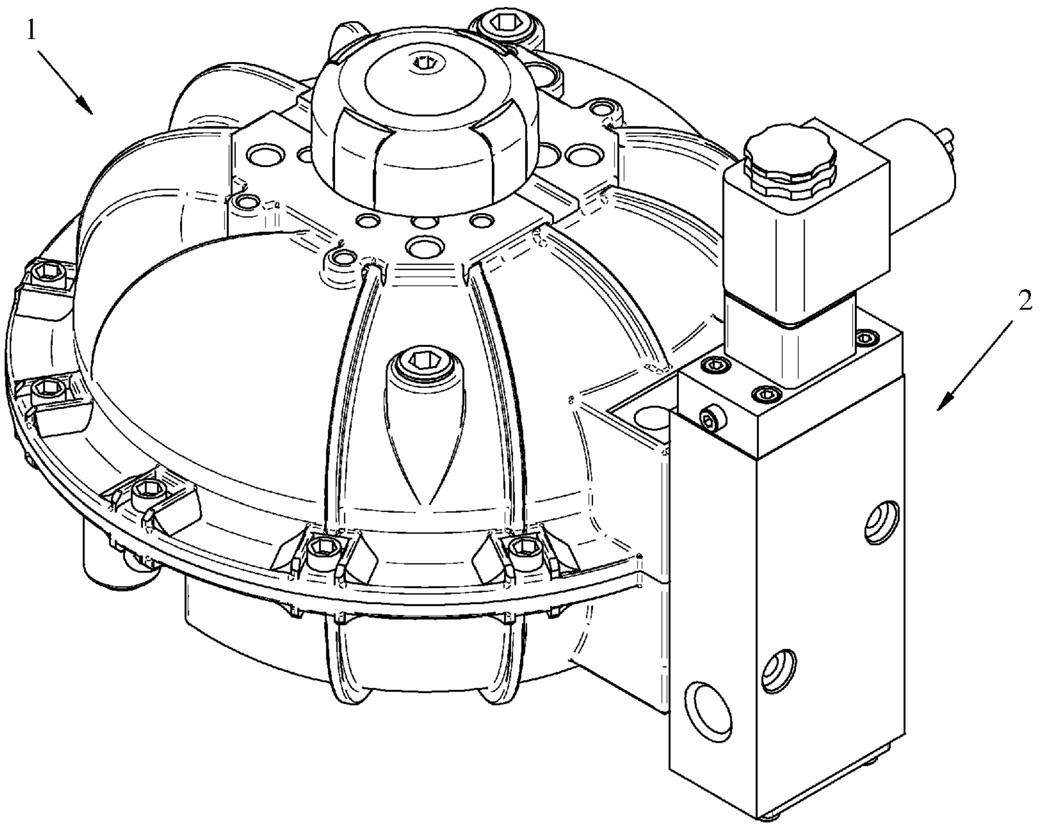
FIG. 1 illustrates a three-dimensional schematic view of one embodiment of the present invention.
Figure 2:
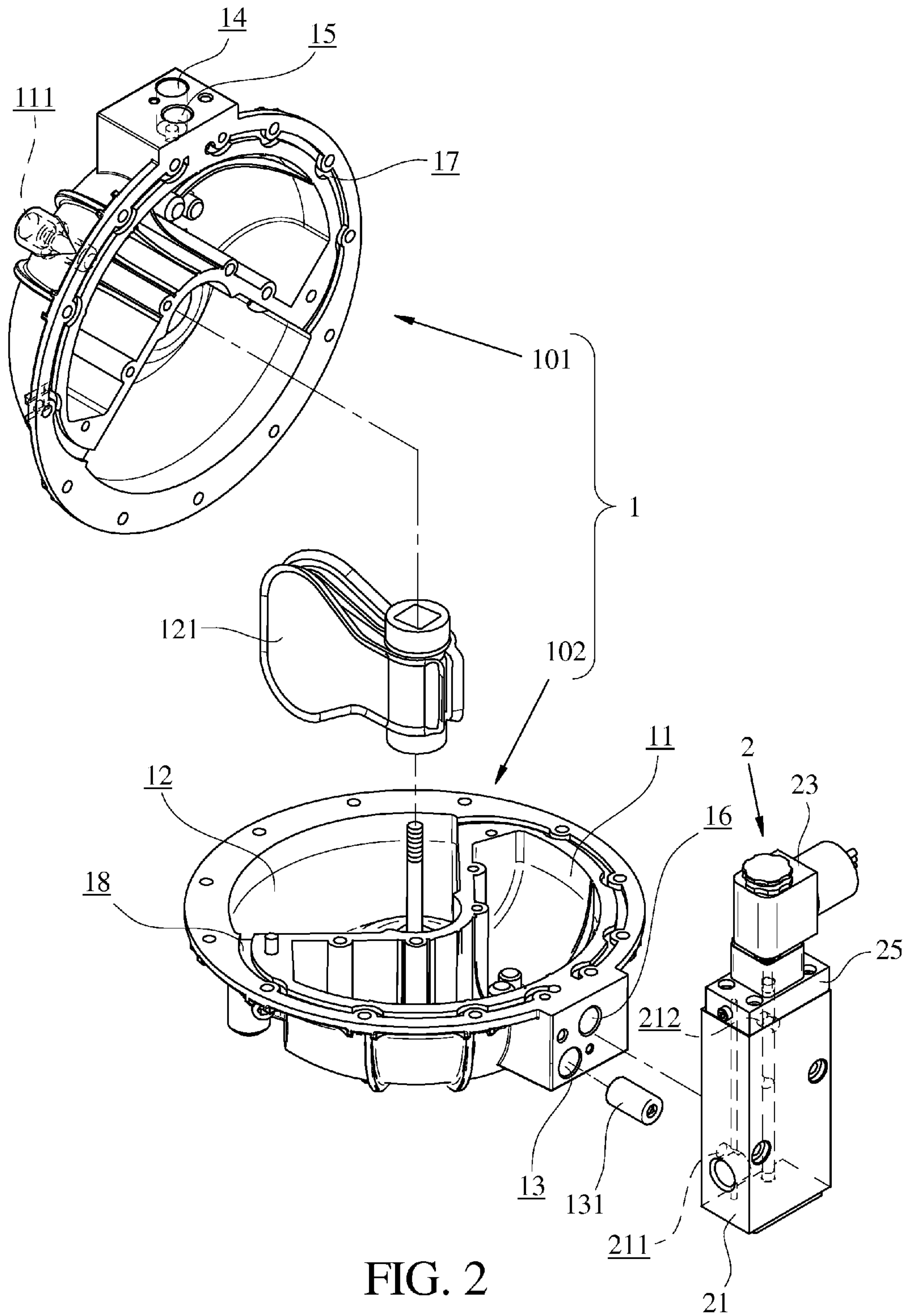
FIG. 2 illustrates a three-dimensional exploded view of the pneumatic actuator in the present invention.
Figure 3:
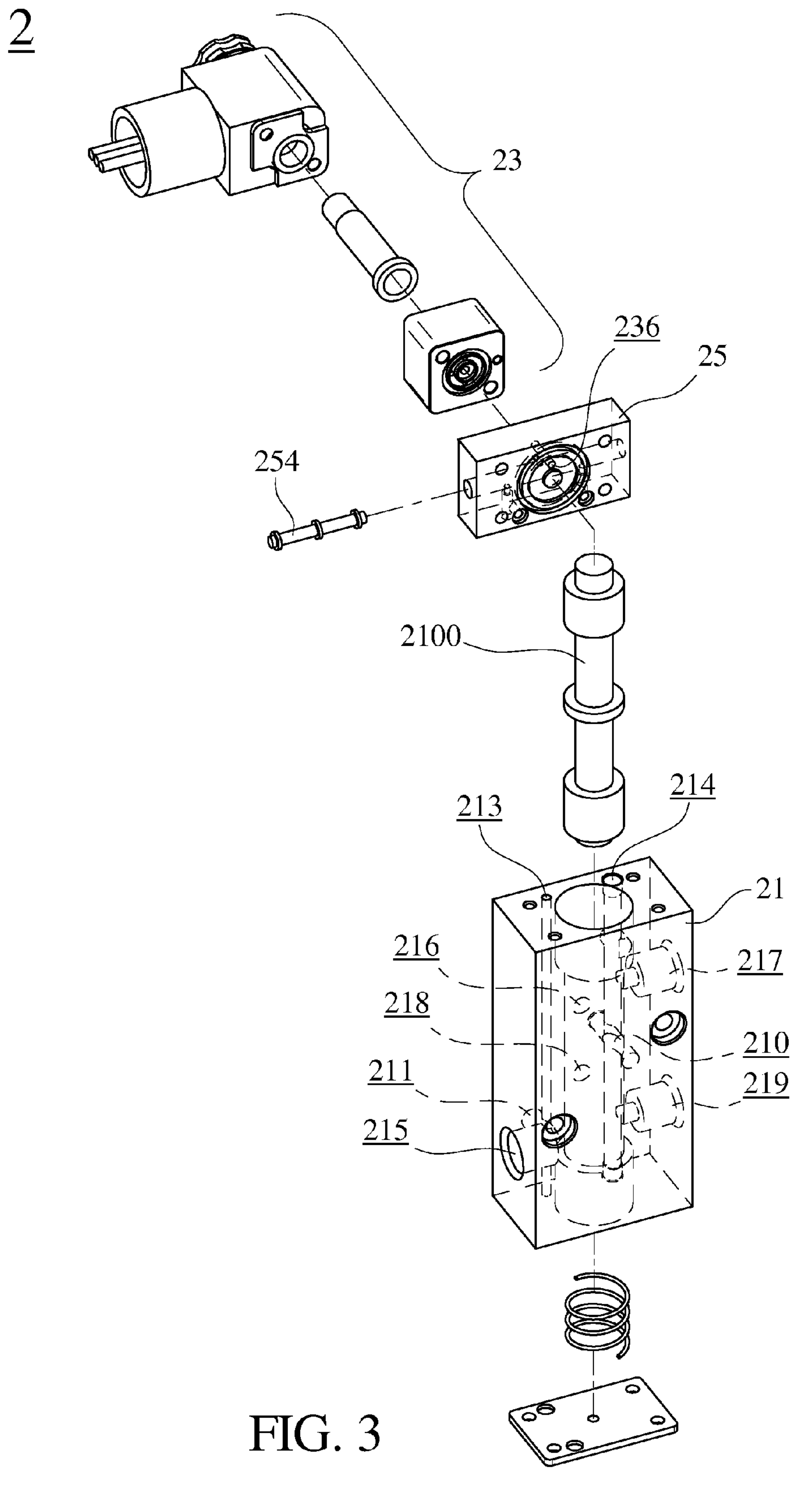
FIG. 3 illustrates an exploded view of the solenoid air flow control valve in the present invention.
Figure 4:
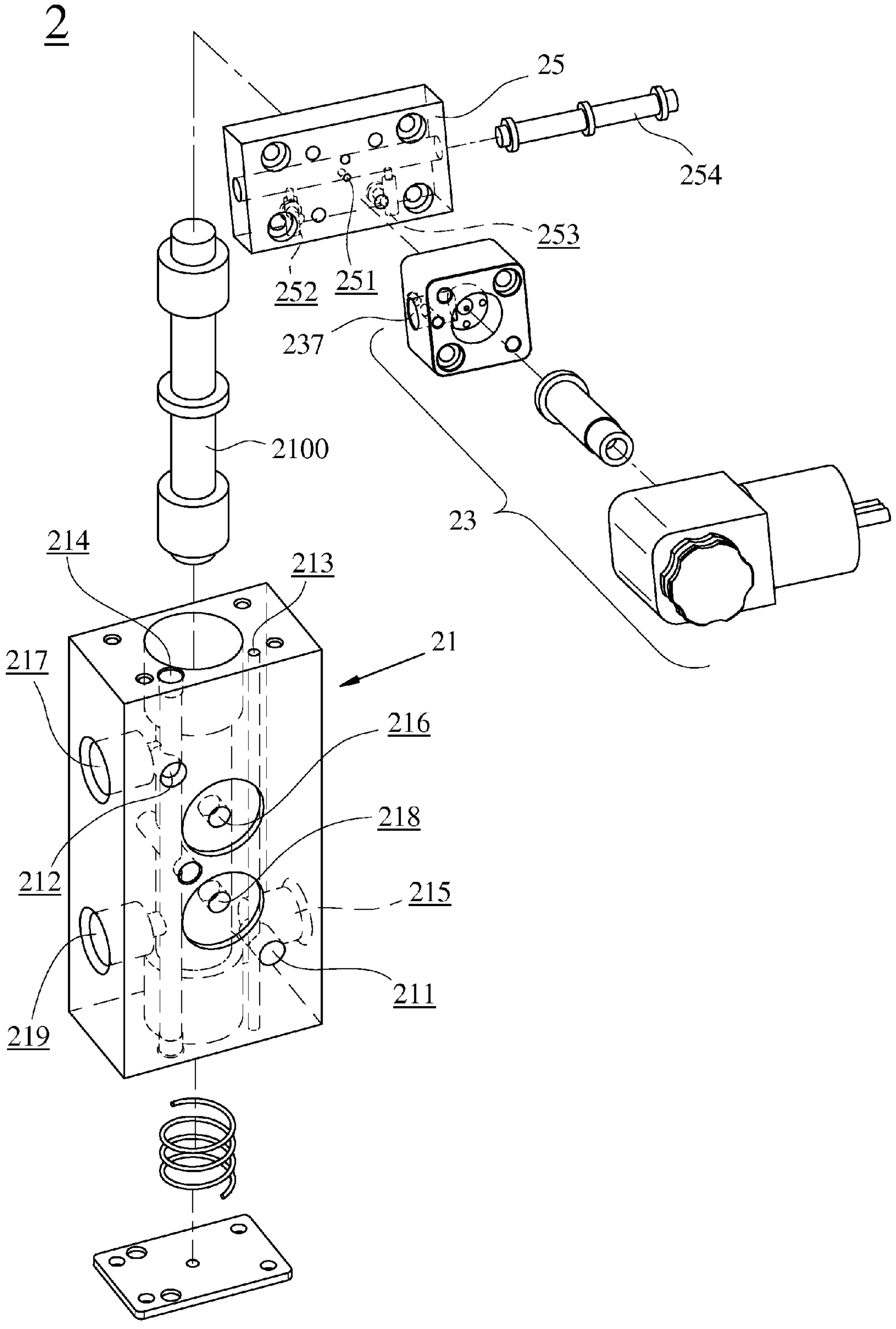
FIG. 4 illustrates another exploded view of the solenoid air flow control valve in the present invention.
Figure 5:
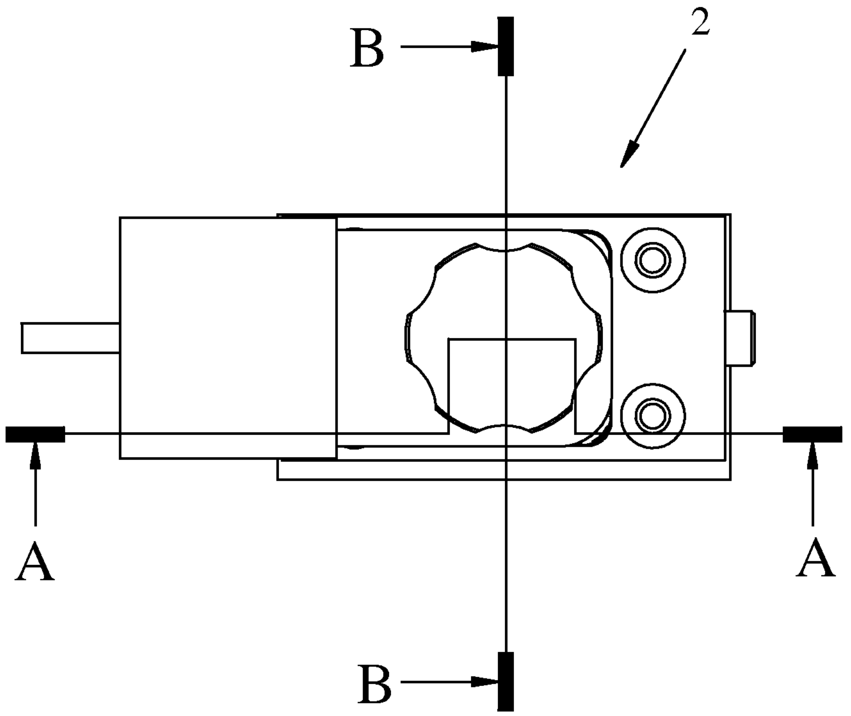
FIG. 5 is a top view of the solenoid air flow control valve in the present invention.
Figure 5A:
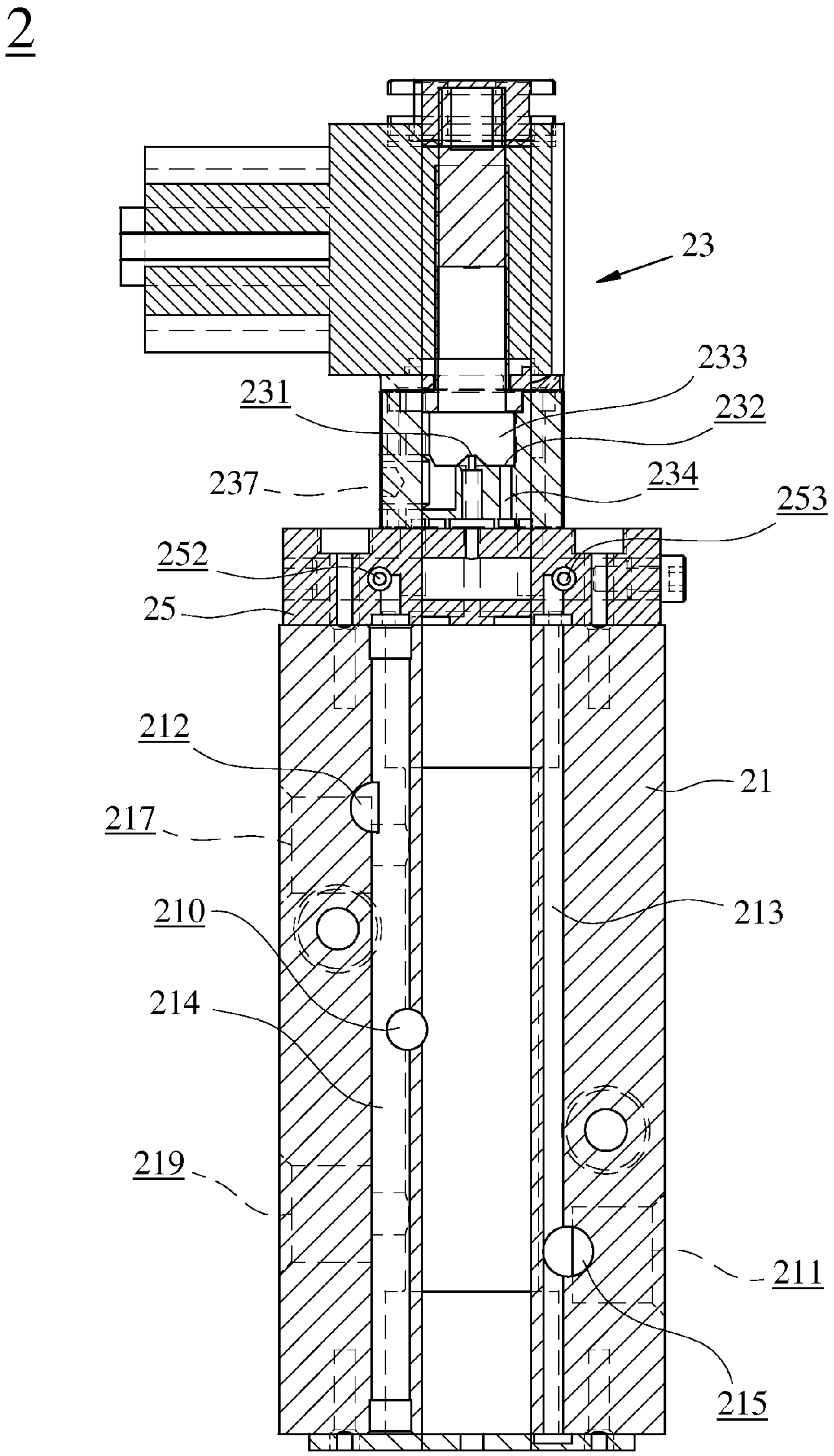
FIG. 5A is a sectional view of the solenoid air flow control valve in the present invention.
Figure 6:
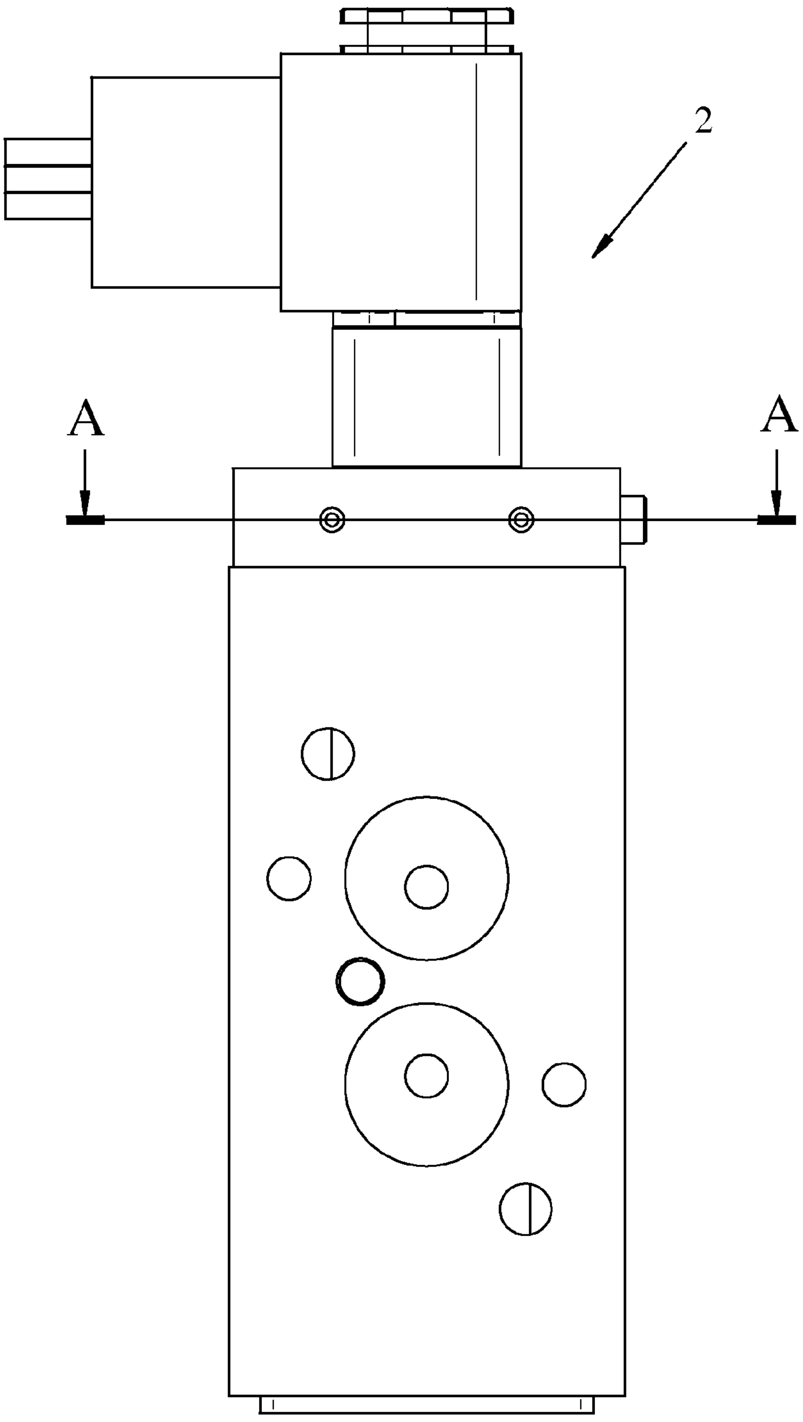
FIG. 6 is a lateral view of the solenoid air flow control valve in the present invention.
Figure 6A:
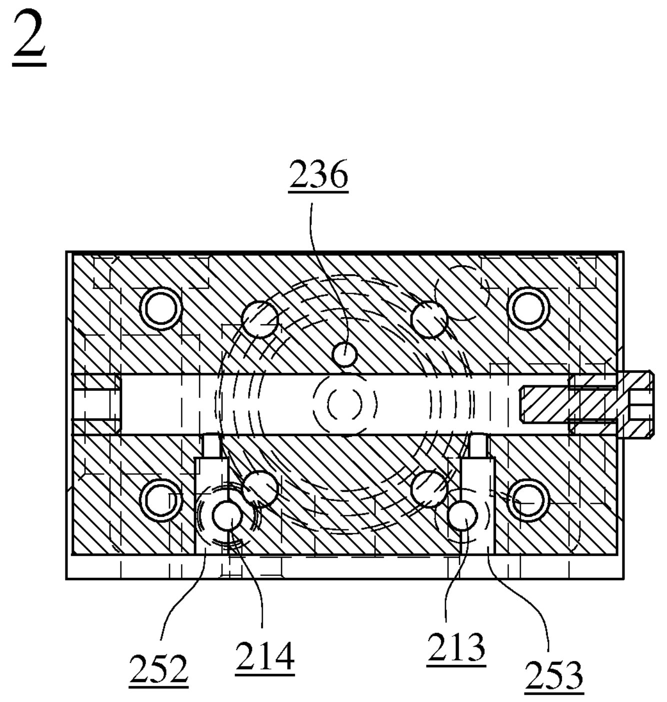
FIG. 6A is another sectional view of the solenoid air flow control valve in the present invention.
Figure 7A:
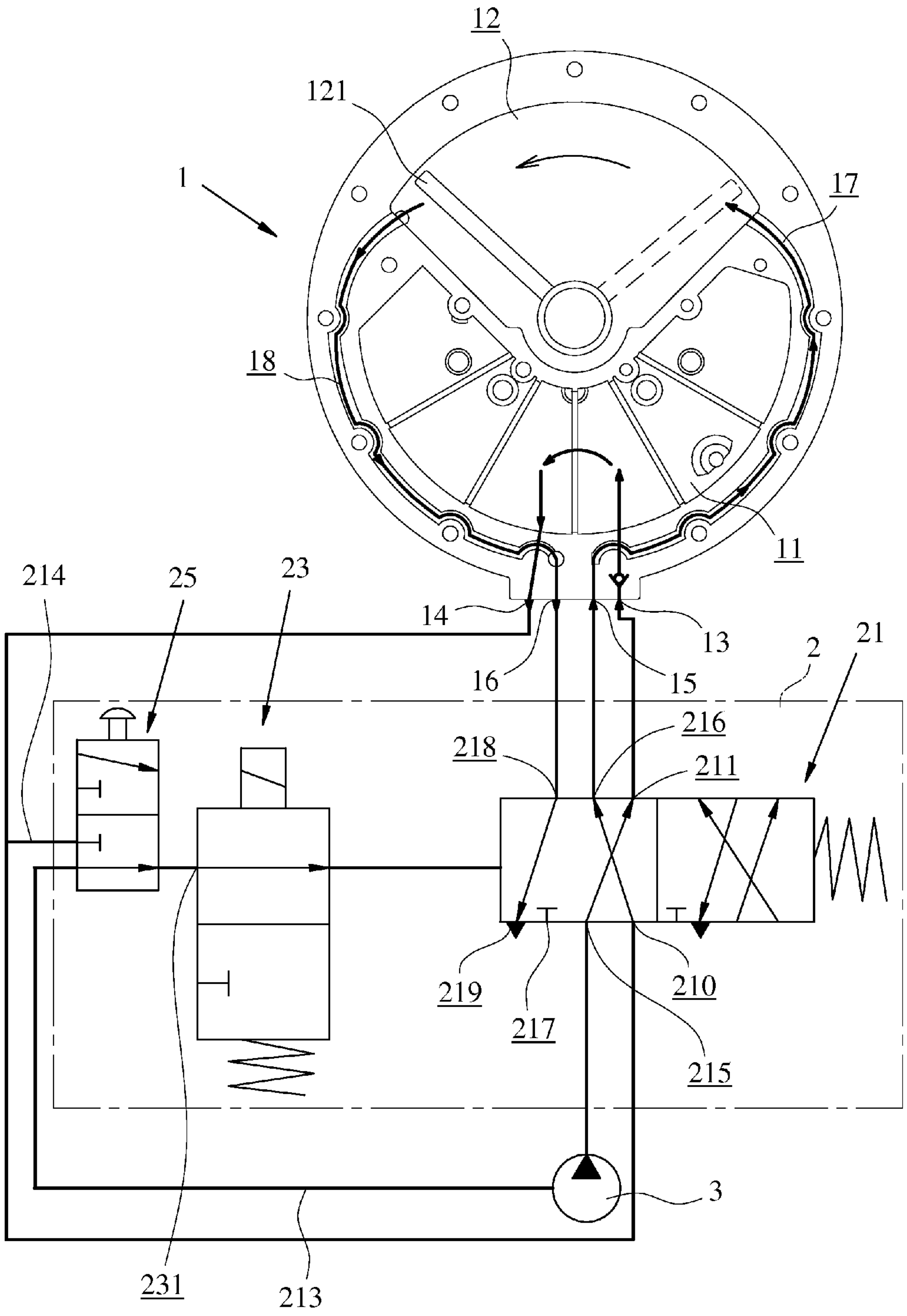
FIG. 7A illustrates one embodiment of the fail-safe model under normal operation in the present invention.
Figure 7B:
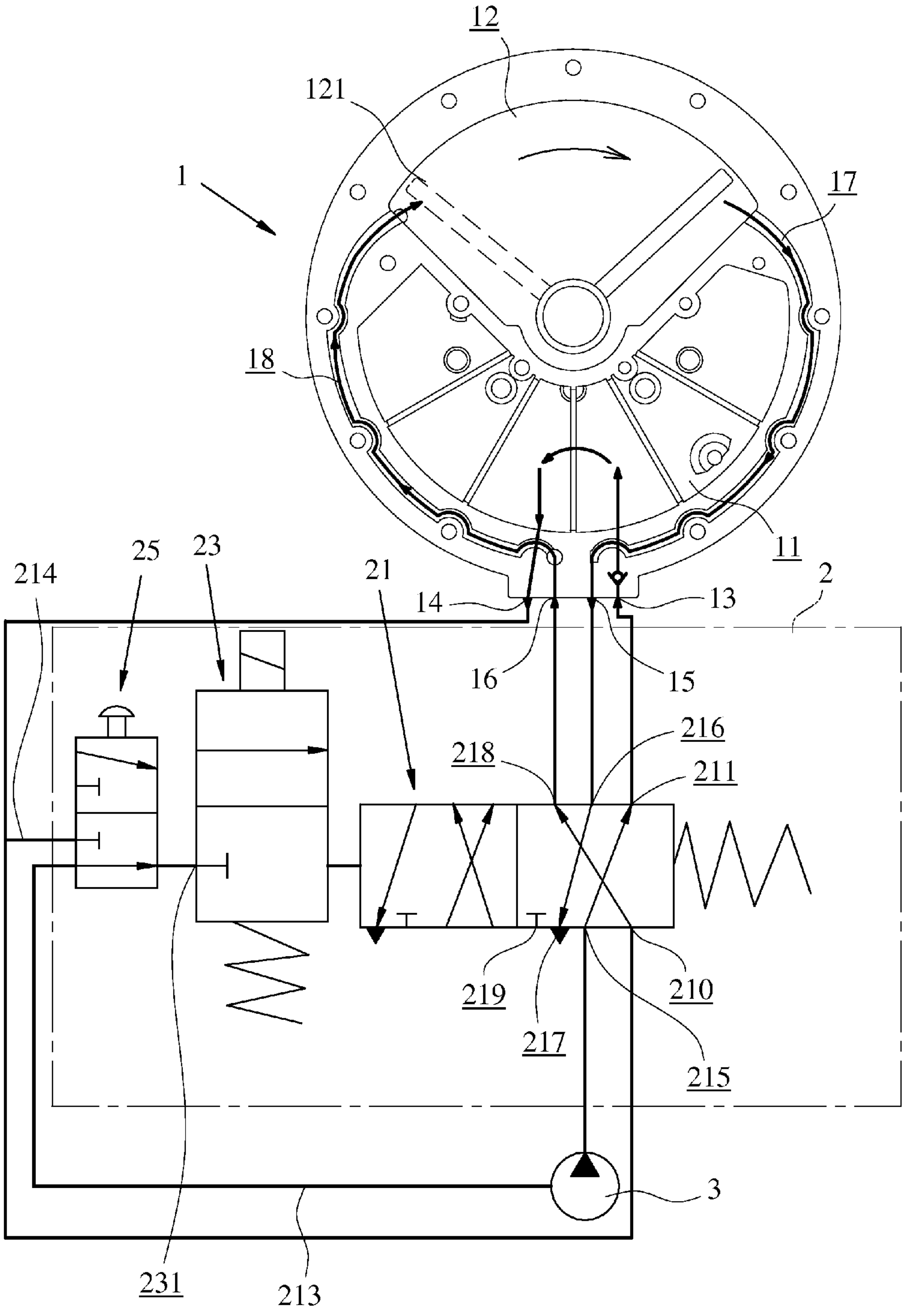
FIG. 7B illustrates one embodiment of the fail-safe model regarding the pilot solenoid valve which is not actuated in the present invention.
Figure 7C:
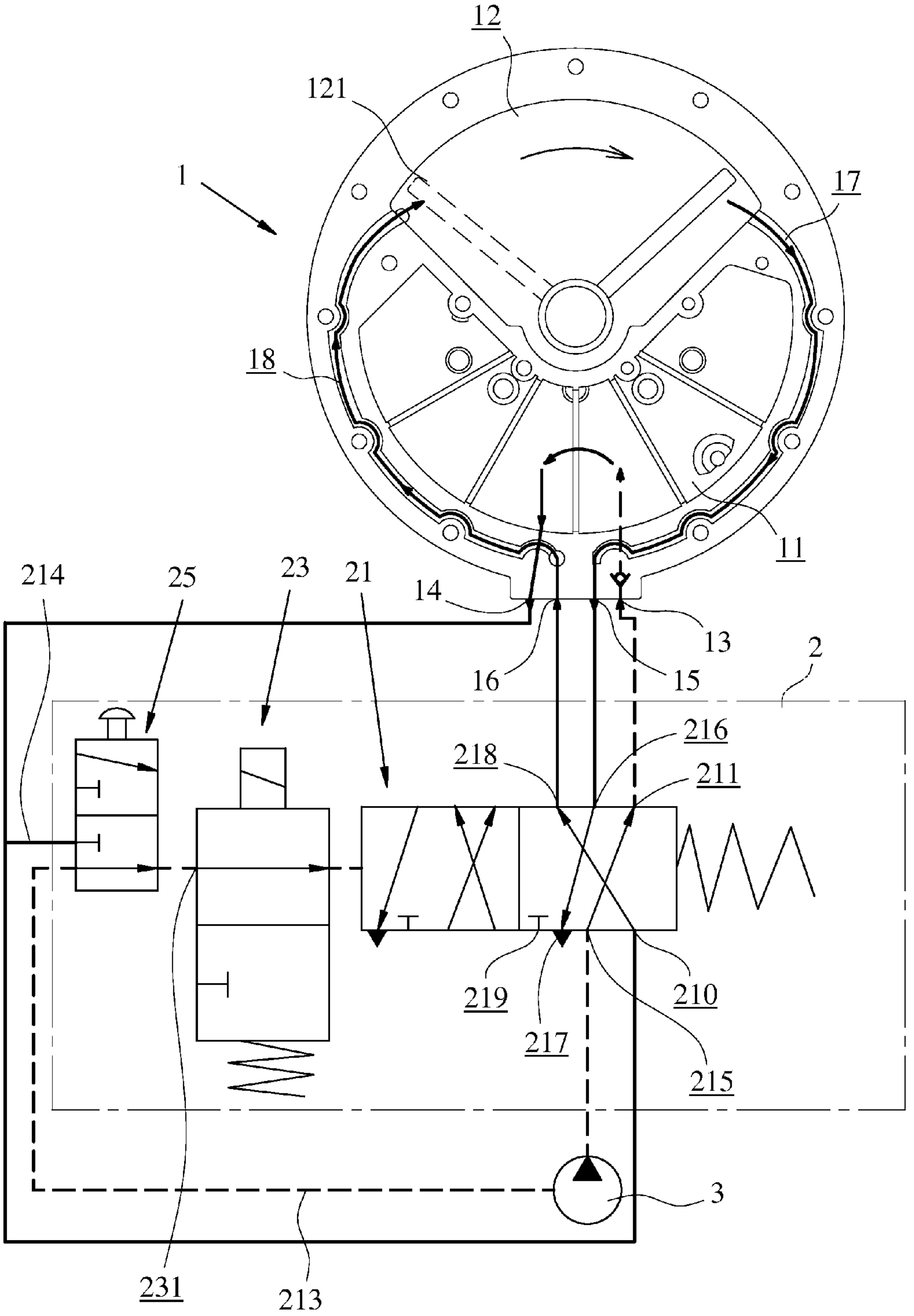
FIG. 7C illustrates one embodiment of the fail-safe model regarding the air source which does not provide air in the present invention.
Figure 8A:
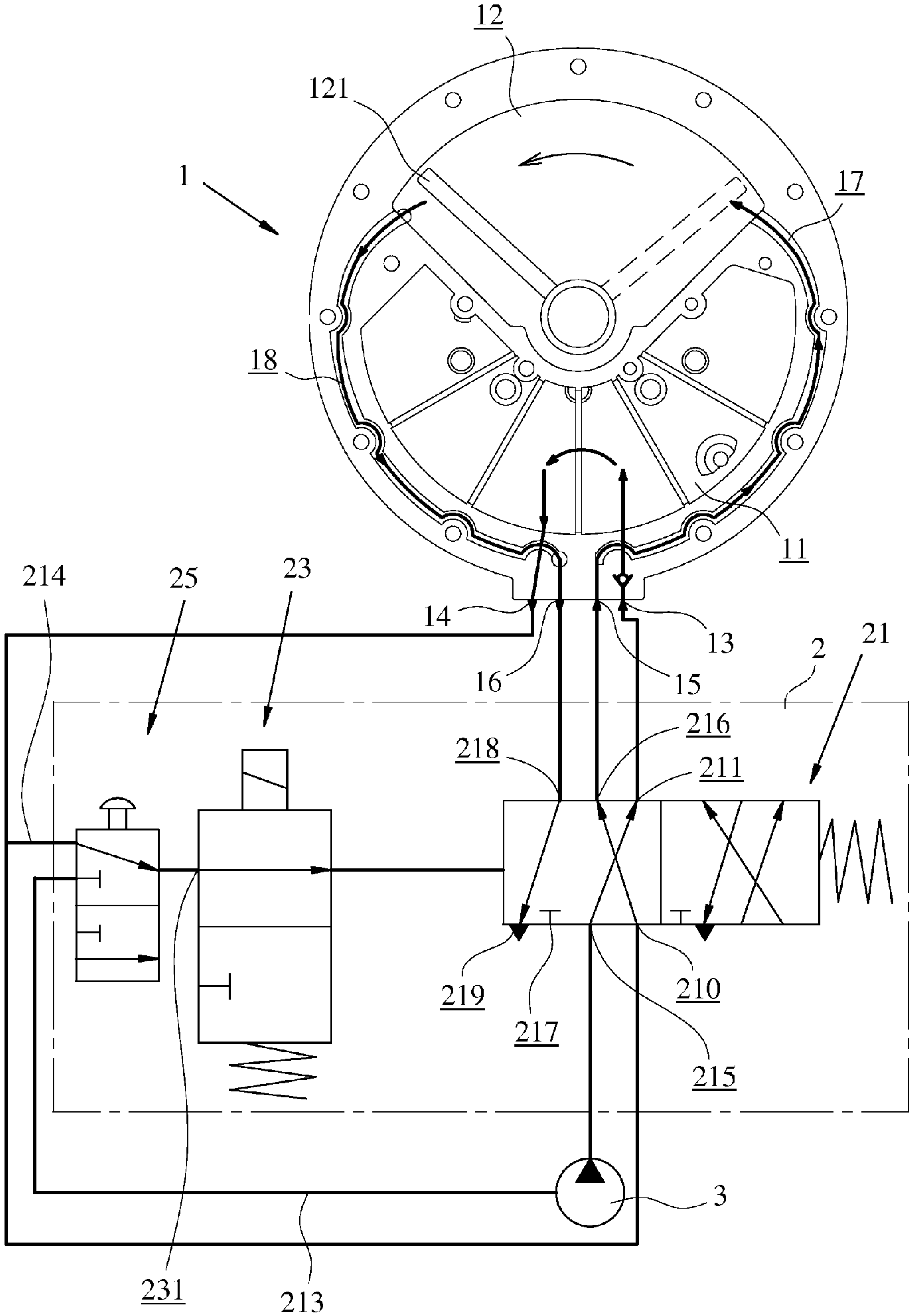
FIG. 8A provides one embodiment of the double-acting model under normal operation in the present invention.
Figure 8B:
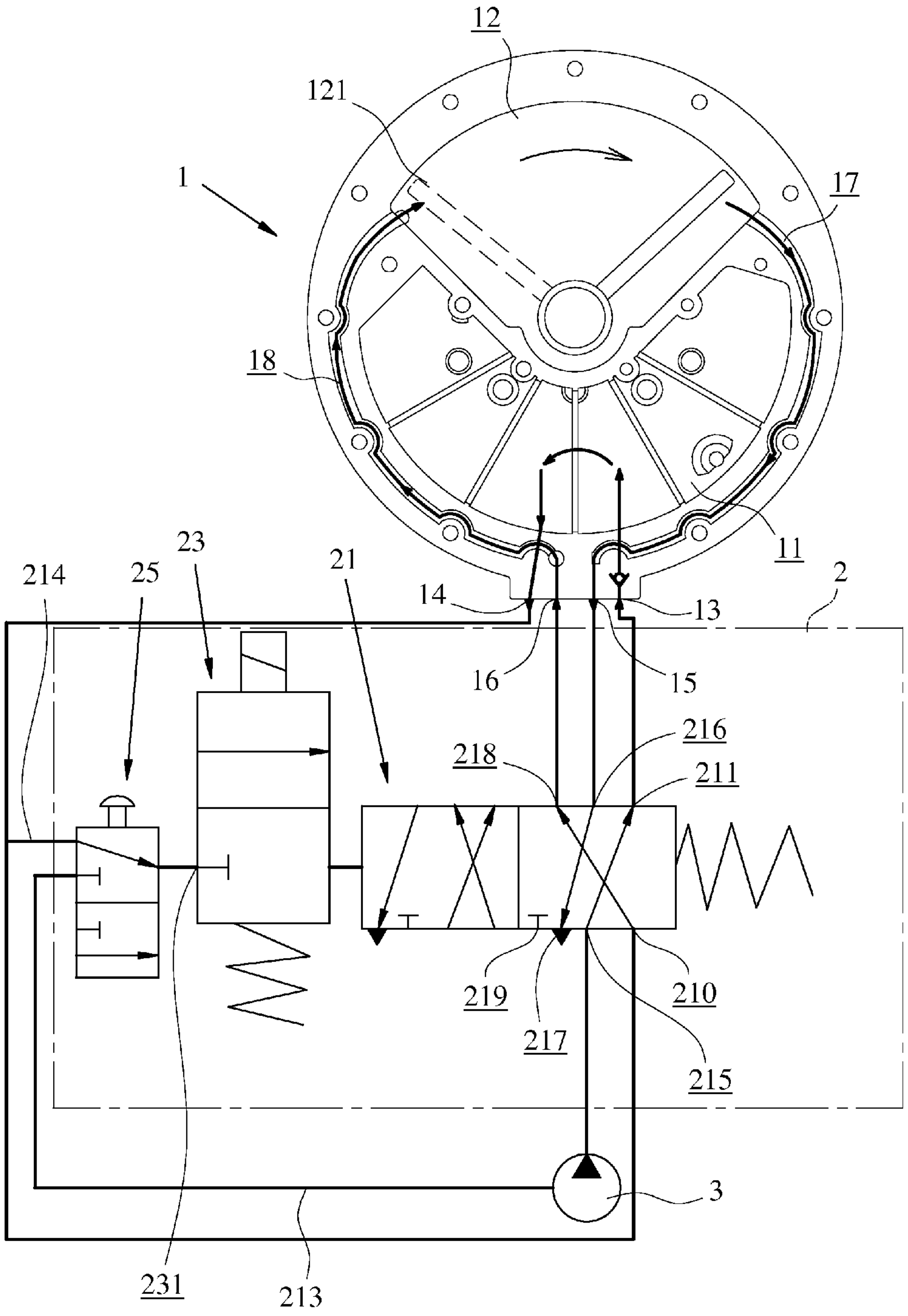
FIG. 8B illustrates one embodiment of the double-acting model regarding the pilot solenoid valve which is not actuated in the present invention.
Figure 8C:
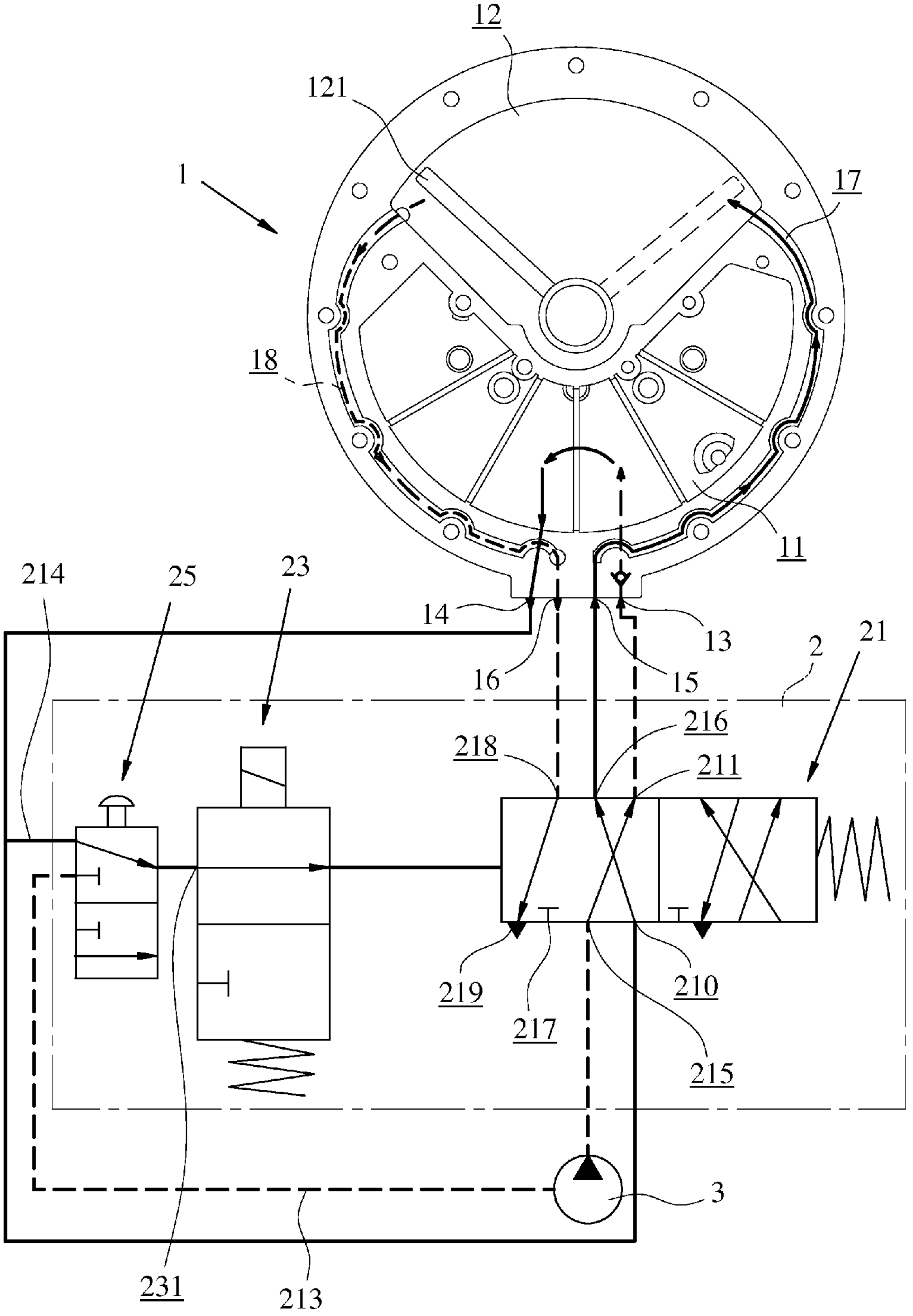
FIG. 8C illustrates one embodiment of the double-acting model regarding the air source which does not provide air in the present invention.

Referring to FIGS. 1 to 8C, this invention provides a pneumatic actuator air flow control system, including: a pneumatic rotary actuator (1) which includes an air reservoir (11) and a vane housing (12) which has an air-driven vane (121) inside; and the air reservoir (11) has a larger volume ratio than the vane housing (12), wherein the pneumatic rotary actuator (1) has positioning holes 1A, 1B, 1C and 1D (13, 14, 15, 16) on its lateral surface, the positioning holes 1A (13) and 1B (14) connected to the air reservoir (11) directly and the positioning hole 1A (13) having a non-return valve (131); the positioning hole 1C (15) connected with the vane housing (12) through a first tube (17) to drive the vane (121) to an open position; and the positioning hole 1D (16) connected with the vane housing (12) through a second tube (18) to drive the vane (121) to an restored position; a solenoid air flow control valve (2), which can be quickly switched between a fail-safe mode and a double-acting mode under different circumstances; the solenoid air flow control valve (2) including a flow control valve body (21), a pilot solenoid valve (23) and a switch system (25) to be formed as one unit, wherein the flow control valve body (21) is connected with the pneumatic rotary actuator (1) and directs air flow from an air source (3) to the air reservoir (11) of the pneumatic rotary actuator (1), the flow control valve body (21) having an air reservoir air inlet port (211) and an air reservoir outlet port (212) to connect with the positioning holes 1A (13) and 1B (14) respectively, and a single-acting air flow path (213) connected to the air reservoir air inlet port (211) and a double-acting air flow path (214) connected to the air reservoir outlet port (212), wherein the single-acting air flow path (213) is connected with the switch system (25) through a single-acting connector (253) and the double-acting air flow path (214) is connected with the switch system (25) through a double-acting connector (252); and the flow control valve body (21) further includes a first hole (215), a second hole (216), a third hole (217), a fourth hole (218), a fifth hole (219), an intermediate connecting port (210) and a spool (2100), wherein the first hole (215) is an inlet hole while the third hole (217) and the fifth hole (219) are outlet holes, and the intermediate connecting port (210) is located at the double-acting air flow path (214) and according to whether the spool (2100) is compressed to change its position to determine whether the air flow from the air reservoir outlet port (212) through the double-acting air flow path (214) should be connected to the second hole (216) or the fourth hole (218). If the intermediate connecting port (210) is connected with the second hole (216), the air flows through the second hole (216) and the positioning hole 1C (15) of the pneumatic rotary actuator (1) into the pneumatic rotary actuator (1) through the first tube (17) to rotate the vane (121) to its open position. If the intermediate connecting port (210) is connected with the fourth hole (218), the air flows through the fourth hole (218) and the positioning hole 1D (16) of the pneumatic rotary actuator (1) through the second tube (18) to rotate the vane (121) to its restored position. The pilot solenoid valve (23) of the solenoid air flow control valve (2) determines whether the air flow can pass or not and determine whether the spool (2100) of the flow control valve body (21)

is compressed to change the air flow path in and out the vane housing (12) of the pneumatic rotary actuator (1) to further change the rotating direction of the vane (121). The pilot solenoid valve (23) of the solenoid air flow control valve (2) includes a positioning hole 2A (231), at least one positioning hole 2B (232) and a plunger (233) to control whether to open or close the positioning hole 2A (231), wherein the positioning hole 2B (232) is located next to the positioning hole 2A (231), so that the air flows into the positioning hole 2A (231) is connected with the positioning hole 2B (232) to a combining tube (234), and a ring-shape space (235) directs the air in the combining tube (234) to a compressed tube (236) and the air flows through the switch system (25) from the compressed tube (236) into the flow control valve body (21) to compress the spool (2100). The plunger (233) can open or close the positioning hole 2A (231) through the pilot solenoid valve (23) to determine whether there is power supply or through a manual override (237) and determine whether to connect the positioning hole 213 (232) to the compressed tube (236) according to the situation (open or closed) of the positioning hole 2A (231). The switch system (25) can be manually switched to the fail-safe model and double-acting model. The switch system (25) having a switch spool (254) with axial movement and connecting with the positioning hole 2A (231) of the pilot solenoid valve (23) through a connecting path (251), so that the double-acting mode (air flowing from the double-acting air flow path (214) through the double-acting connector (252) to the switch system (25)) or the fail-safe mode (air flowing from the single-acting air flow path (213) through the single-acting connector (253) to the switch system (25)) is determined by the movement of the switch spool (254), wherein the pneumatic rotary actuator (1) mentioned above is combination of a first-half actuator (101) and a second-half actuator (102), and both of which are formed by an identical molding and are of the same shape and structure. The first tube (17) and the second tube (18) can be located recessedly on a combination surface created by the first-half actuator (101) and the second-half actuator (102).

Figure 5B:
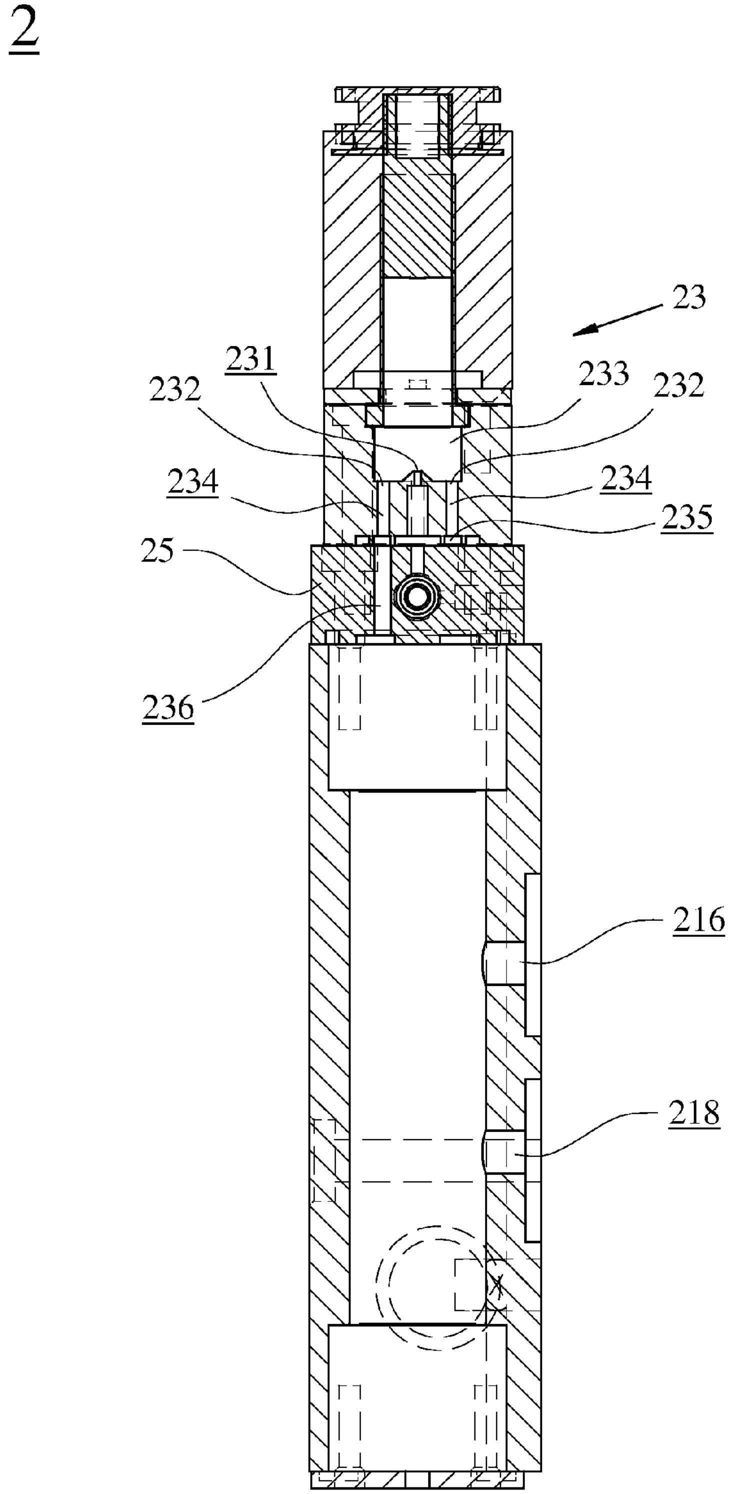
FIG. 5B is another sectional view of the solenoid air flow control valve in the present invention.

Under the fail-safe model and the double-acting model in the present invention, when the pilot solenoid valve (23) is not actuated due to power failure or other circumstances, or when the air source (3) does not provide air, the actuation status in the present invention is different and the actuation status is illustrated as following:

Referring to FIGS. 2 to 5B and 7A, under normal operation in the fail-safe model, the pilot solenoid valve (23) is charged to open the positioning hole 2A (231) and the air partially provided by the air source (3) flows through the single-acting air flow path (213) into the switch system (25) and inside the pilot solenoid valve (23) to compress the spool (2100) inside the flow control valve body (21), and the other portion of the air provided by the air source (3) flows through the first hole (215), the air reservoir air inlet port (211) and the positioning hole 1A (13) of the pneumatic rotary actuator (1) into the air reservoir (11) and fills the air reservoir (11). The air in the air reservoir (11) flows through the positioning hole 1B (14) and the air reservoir outlet port (212) into the intermediate connecting port (210) of the flow control valve body (21), and the air flows from the second hole (216) to the positioning hole 1C (15) and through the first tube (17) to drive the vane (121) in a counterclockwise manner to open the valve body.

Referring to FIGS. 2 to 5B and 7B, under the fail-safe model, when there is power failure or other circumstances which cause the pilot solenoid valve (23) not to actuate the positioning hole 2A (231) is closed and the air partially provided by the air source (3) cannot get into the switch system (25) and the pilot solenoid valve (23) through the single-acting air flow path (213). At this time, the spool (2100) inside the flow control valve body (21) is not compressed and the air provided by the air source (3) flows from the first hole (215); the air reservoir air inlet port (211) and the positioning hole 1A (13) of the pneumatic rotary actuator (1) into the air reservoir (11) and fills the air reservoir (11). The air in the air reservoir (11) flows through the positioning hole 1B (14) and the air reservoir outlet port (212) into the intermediate connecting port (210) of the flow control valve body (21), and the air flows from the fourth hole (218) to the positioning hole 1D (16) and through the second tube (18) to drive the vane (121) in a clockwise manner to close the valve body.

Referring to FIGS. 2 to 5B and 7C, under the fail-safe model, when the pilot solenoid valve (23) is actuated but the air source (3) does not provide air, there is no air flowing into the switch system (25) and the pilot solenoid valve (23), and the spool (2100) is not compressed. At this time, the air in the air reservoir (11) flows through the positioning hole 1B (14) and the air reservoir outlet port (212) into the intermediate connecting port (210) of the flow control valve body (21), and the air flows from the fourth hole (218) to the positioning hole 1D (16) and through the second tube (18) to drive the vane (121) in a clockwise manner to close the valve body. This is so called safely restored.

Referring to FIGS. 2 to 5B and 8A, under normal operation in the double-acting model, the pilot solenoid valve (23) is charged to open the positioning hole 2A (231) and the air provided by the air source (3) flows through the first hole (215), the air reservoir air inlet port (211) and the positioning hole 1A (13) of the pneumatic rotary actuator (1) into the air reservoir (11) and fills the air reservoir (11). The air in the air reservoir (11) flows through the positioning hole 1B (14) and the air reservoir outlet port (212) through the double-acting air flow path (214) into the switch system (25) and the pilot solenoid valve (23) to further compress the spool (2100) therein. Part of the air in the air reservoir (11) flows through the positioning hole 1B (14) and the air reservoir outlet port (212) to the intermediate connecting port (210) of the flow control valve body (21), and the air flows from the second hole (216) to the positioning hole 1C (15) and through the first tube (17) to drive the vane (121) in a counterclockwise manner to open the valve body.

Referring to FIGS. 2 to 5B and 8B, under the double-acting model, when there is power failure or other circumstances which cause pilot solenoid valve (23) not to actuate, the positioning hole 2A (231) is closed. At this time, the spool (2100) inside the flow control valve body (21) is not compressed and the air provided by the air source (3) flows from the first hole (215), the air reservoir air inlet port (211) and the positioning hole 1A (13) into the air reservoir (11) and fills the air reservoir (11). The air in the air reservoir (11) flows through the positioning hole 1B (14) and the air reservoir outlet port (212) into the intermediate connecting port (210) of the flow control valve body (21), and the air flows from the fourth hole (218) to the positioning hole 1D (16) and through the second tube (18) to drive the vane (121) to its restored position.

Referring to FIGS. 2 to 5B and 8C, under the double-acting model, when the pilot solenoid valve (23) is actuated but the air source (3) does not provide air, the pilot solenoid valve (23) is charged to open the positioning hole 2A (231), and part of the air in the air reservoir (11) flows through the positioning hole 1B (14) and the air reservoir outlet port (212) into the switch system (25) and the pilot solenoid valve (23) through the double-acting air flow path (214) to compress the spool (2100) inside the flow control valve body (21). Also, part of the air in the air reservoir (11) flows into the intermediate connecting port (210) of the flow control valve body (21), and the air flows from the second hole (216) to the positioning hole 1C (15) and through the first tube (17) to compress the vane (121) so that the vane (121)'s position keeps unchanged.

The pneumatic rotary actuator (1) has an air reservoir hole (111) to connect the air reservoir (11) and outside, and the air source (3) can provide air directly into the air reservoir (11) through the air reservoir hole (111), so that under either fail-safe or double-acting model and no matter the pilot solenoid valve (23) is charged or not, the pneumatic rotary actuator (1) can be adjusted under these circumstances.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A pneumatic actuator air flow control system, comprising:

a pneumatic rotary actuator which includes an air reservoir and a vane housing which has an air-driven vane therein and the air reservoir has a larger volume ratio than the vane housing, wherein the pneumatic rotary actuator has a first positioning hole, a second positioning hole, a third positioning hole and a fourth positioning hole on its lateral surface, the first and second positioning holes connected to the air reservoir directly and the first positioning hole having a non-return valve; the third positioning hole connected with the vane housing through a first tube to drive the vane to an open position; and the fourth positioning hole connected with the vane housing through a second tube to drive the vane to a restored position to further close a valve body; and a solenoid air flow control valve, which is quickly switched between a fail-safe model and a double-acting mode under different circumstances; the solenoid air flow control valve including a flow control valve body, a pilot solenoid valve and a switch system to be formed as one unit, wherein the flow control valve body is connected with the pneumatic rotary actuator and directs air flow from an air source to the air reservoir of the pneumatic actuator, the pilot solenoid valve of the solenoid air flow control valve is adapted to control and change the air flow in and out the vane housing of the pneumatic rotary actuator to further change the rotating direction of the vane, and the switch system is adapted to manually switch between the fail-safe model and the double-acting model so that the solenoid air flow control valve has three controlling components;

wherein the flow control valve body has an air reservoir air inlet port and an air reservoir outlet port to connect with the first and second positioning holes; a single-acting air flow path connected to the air reservoir air inlet port and a double-acting air flow path connected to the air reservoir outlet port, wherein the single-acting air flow path is connected with the switch system through a single-acting connector and the double-acting air flow path is connected with the switch system through a double-acting connector; and the flow control valve body further includes a first hole, a second hole, a third hole, a fourth hole, a fifth hole, an intermediate connecting port and a spool, wherein the first hole is an inlet hole while the third hole and the fifth hole are outlet holes, and the intermediate hole is located at the double-acting air flow path and according to whether the spool is compressed or not to change its position, the air flow from the air reservoir outlet port through the double-acting air flow path is determined to connect to the second hole or the fourth hole, wherein if the intermediate connecting port is connected to the second hole, the air flows through the second hole and the third positioning hole of the pneumatic rotary actuator into the pneumatic rotary actuator through the first tube to rotate the vane to its open position; and if the intermediate connecting port is connected with the fourth hole, the air flows through the fourth hole and the fourth positioning hole of the pneumatic rotary actuator through the second tube to rotate the vane to its restored position, wherein the pilot solenoid valve of the solenoid air flow control valve includes a first valve positioning hole, at least one second valve positioning hole and a plunger to control whether to open or close the first valve positioning hole, and the second valve positioning hole is located next to the first valve positioning hole, so that the air flows into the first valve positioning hole and is connected with the second valve positioning hole to a combining tube, and a ring-shape space directs the air in the combining tube to a compressed tube and the air flows from the compressed tube through the switch system into the flow control valve body to compress the spool, wherein the plunger is adapted to open or close the first valve positioning hole through the pilot solenoid valve or through a manual override and determine whether to connect the second valve positioning hole, to the compressed tube according to whether the first valve positioning hole is open or closed, and the switch system is connected with the first valve positioning hole in the pilot solenoid valve through a connecting path, and has a switch spool with axial movement to determine whether the air flows from the double-acting air flow path through the double-acting connector to the switch system of the double-acting model or the air flowing from the single-acting air flow path through the single-acting connector to the switch system of the fail-safe model.

2. The pneumatic actuator air flow control system of claim 1, wherein under normal operation in the fail-safe model, the pilot solenoid valve is charged to open the first valve positioning hole and the air partially provided by the air source flows through the single-acting air flow path into the switch system and inside the pilot solenoid valve to compress the spool inside the flow control valve body, and the other portion of the air provided by the air source flows through the first hole, the air reservoir air inlet port and the first positioning hole, into the air reservoir and fill the air reservoir, and the air in the air reservoir flows through the second positioning hole, and the air reservoir outlet port into the intermediate connecting port of the flow control valve body, and the air further flows from the second hole to the third positioning hole, and through the first tube to drive the vane to open the valve body.

3. The pneumatic actuator air flow control system of claim 1, wherein under the fail-safe model, when the pilot solenoid valve not actuated, the first valve positioning hole is closed and the air partially provided by the air source is not allowed to get into the switch system and the pilot solenoid valve through the single-acting air flow path, so the spool inside the flow control valve body is not compressed and the air provided by the air source flows from the first hole, the air reservoir air inlet port and the first positioning hole into the air reservoir and fills the air reservoir, and the air in the air reservoir flows through the second positioning hole and the air reservoir outlet port into the intermediate connecting port of the flow control valve body, and the air further flows from the fourth hole to the fourth positioning hole and through the second tube to drive the vane to rotate to its restored position.

4. The pneumatic actuator air flow control system of claim 1, wherein under the fail-safe model, when the pilot solenoid valve is actuated but the air source does not provide air, no air flows into the switch system and the pilot solenoid valve at this time, so the spool is not compressed and the air in the air reservoir flows through the second positioning hole and the air reservoir outlet port into the intermediate connecting port of the flow control valve body, and the air further flows from the fourth hole to the fourth positioning hole and through the second tube to drive the vane to rotate to its restored position.

5. The pneumatic actuator air flow control system of claim 1, wherein under normal operation in the double-acting model, the pilot solenoid valve is charged to open the first valve positioning hole and the air provided by the air source flows through the first hole, the air reservoir air inlet port and the first positioning hole of the pneumatic rotary actuator into the air reservoir and fills the air reservoir, and part of the air in the air reservoir flows from the second positioning hole and the air reservoir outlet port through the double-acting air flow path into the switch system and the pilot solenoid valve to further compress the spool therein, while the other part of the air in the air reservoir flows through the second positioning hole and the air reservoir outlet port to the intermediate connecting port of the flow control valve body, and the air further flows from the second hole to the third positioning hole and through the first tube to drive the vane to rotate to its open position.

6. The pneumatic actuator air flow control system of claim 1, wherein under the double-acting model, when the pilot solenoid valve is not actuated, the first valve positioning hole is closed and the spool inside the flow control valve body is not compressed and the air provided by the air source flows from the first hole, the air reservoir air inlet port and the first positioning hole into the air reservoir and fills the air reservoir, and the air in the air reservoir flows through the second positioning hole and the air reservoir outlet port into the intermediate connecting port of the flow control valve body, and the air further flows from the fourth hole to the fourth positioning hole and through the second tube to drive the vane to rotate to its restored position.

7. The pneumatic actuator air flow control system of claim 1, wherein under the double-acting model, when the pilot solenoid valve is actuated but the air source does not provide air, the pilot solenoid valve is charged to open the first valve positioning hole, and part of the air in the air reservoir flows through the second positioning hole, the air reservoir outlet port and the double-acting air flow path into the switch system and the pilot solenoid valve to compress the spool inside the flow control valve body, and part of the air in the air reservoir flows into the intermediate connecting port of the flow control valve body, and the air further flows from the second hole to the third positioning hole and through the first tube to compress the vane to maintain the open position.

8. The pneumatic actuator air flow control system of claim 1, wherein the pilot solenoid valve further comprises a manual override to manually adjust the plunger and control the first valve positioning hole to open or close.

9. The pneumatic actuator air flow control system of claim 1, wherein the pneumatic rotary actuator includes an air reservoir hole to connect the air reservoir and outside, and the air source provides air directly into the air reservoir through the air reservoir hole.

10. The pneumatic actuator air flow control system of claim 1, wherein the pneumatic rotary actuator is a combination of a first-half actuator and a second-half actuator, and both of which are formed by an identical molding and are of the same shape and structure, and the first tube and the second tube are located recessedly on a combination surface created by the first-half actuator and the second-half actuator.

* * * * *